US008889286B2

(12) United States Patent
Jo et al.

(10) Patent No.: US 8,889,286 B2
(45) Date of Patent: Nov. 18, 2014

(54) SECONDARY BATTERY AND METHOD OF FABRICATING SECONDARY BATTERY

(75) Inventors: Yunkyung Jo, Yongsin-si (KR); Chanjung Kim, Yongin-si (KR); Sukjung Son, Yongin-si (KR); Miyoung Jang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 725 days.

(21) Appl. No.: 12/895,681

(22) Filed: Sep. 30, 2010

(65) Prior Publication Data

US 2011/0081574 A1 Apr. 7, 2011

(30) Foreign Application Priority Data

Oct. 1, 2009 (KR) .................. 10-2009-0093802
Sep. 9, 2010 (KR) .................. 10-2010-0088327

(51) Int. Cl.
H01M 2/24 (2006.01)
H01M 6/12 (2006.01)
H01M 2/26 (2006.01)
H01M 10/0585 (2010.01)
H01M 2/30 (2006.01)

(52) U.S. Cl.
CPC ............. *H01M 2/263* (2013.01); *H01M 2/266* (2013.01); *H01M 10/0585* (2013.01); *Y02E 60/12* (2013.01); *H01M 2/30* (2013.01)
USPC ............ 429/158; 429/160; 429/162; 29/623.3

(58) Field of Classification Search
USPC .......... 429/158, 160–162, 178, 211; 29/623.3
See application file for complete search history.

(56) References Cited

U.S. PATENT DOCUMENTS

| 2002/0146620 | A1* | 10/2002 | Connell .................. 429/161 |
| 2004/0028999 | A1* | 2/2004 | Richard et al. ........... 429/149 |
| 2004/0033416 | A1* | 2/2004 | Kim et al. ............... 429/175 |
| 2004/0038125 | A1* | 2/2004 | Kim et al. ............... 429/162 |

(Continued)

FOREIGN PATENT DOCUMENTS

| CN | 1753204 A | 3/2006 |
| EP | 1 641 057 A2 | 3/2006 |

(Continued)

OTHER PUBLICATIONS

European Search Report, dated Dec. 17, 2010, corresponding to EP 10251699.4, 17 pgs.

(Continued)

*Primary Examiner* — Muhammad Siddiquee
(74) *Attorney, Agent, or Firm* — Christie, Parker & Hale, LLP

(57) ABSTRACT

An electrode assembly of a secondary battery and a method of fabricating the electrode assembly of the secondary battery. An electrode assembly of a secondary battery includes a first electrode plate, a second electrode plate, and a separator between the first and second electrode plates, the first electrode plate including a first electrode collector and a first electrode tab coupled thereto, and the second electrode plate including a second electrode collector and a second electrode tab coupled thereto; and a protective member surrounding an end of one of the first and second electrode tabs, and a portion of the one of the first and second electrode tabs is exposed from the protective member and is coupled to a non-coating portion of a respective one of the first and second electrode plates.

22 Claims, 8 Drawing Sheets

(56) References Cited

U.S. PATENT DOCUMENTS

| | | | |
|---|---|---|---|
| 2006/0093922 A1* | 5/2006 | Kim et al. | 429/251 |
| 2006/0115722 A1 | 6/2006 | Kim | |
| 2006/0115729 A1* | 6/2006 | Lee | 429/211 |
| 2007/0117009 A1 | 5/2007 | Yamauchi et al. | |
| 2007/0231701 A1* | 10/2007 | Lee | 429/246 |
| 2009/0111011 A1 | 4/2009 | Kim et al. | |
| 2009/0169991 A1 | 7/2009 | Yeh | |
| 2009/0305134 A1* | 12/2009 | Ryu | 429/211 |
| 2009/0317713 A1* | 12/2009 | Kim et al. | 429/164 |
| 2011/0045344 A1 | 2/2011 | Kim | |

FOREIGN PATENT DOCUMENTS

| | | |
|---|---|---|
| EP | 2 139 057 A1 | 12/2009 |
| JP | 61-034857 | 2/1986 |
| JP | 2003-272598 | 9/2003 |
| JP | 2008-027831 | 2/2008 |
| JP | 2009-110928 | 5/2009 |
| KR | 10-0627313 B1 | 9/2006 |
| KR | 10-0686851 B1 | 2/2007 |

OTHER PUBLICATIONS

European Search Report dated Mar. 29, 2011, for corresponding European Patent application 10251699.4, listing cited Category X references in this IDS, as well as EP 1 641 057, previously filed in an IDS dated Jan. 25, 2011.

KIPO Office action dated Feb. 17, 2012, for Korean priority Patent application 10-2010-0088327, 7 pages.

Korean Patent Abstracts for Korean Publication No. 1020060060807, dated Jun. 5, 2006, corresponding to Korean Patent 10-0627313, listed above.

Korean Patent Abstracts for Korean Publication No. 1020060124036, dated May 12, 2006, corresponding to Korean Patent 10-0686851, listed above.

JPO Notice of Allowance dated Aug. 20, 2013, for corresponding Japanese Patent application 2010-220935, (3 pages).

SIPO Office action dated Nov. 25, 2013, for corresponding Chinese Patent application 201010297584.5, (10 pages).

* cited by examiner

SECONDARY BATTERY AND METHOD OF FABRICATING SECONDARY BATTERY

CROSS-REFERENCE TO RELATED APPLICATIONS

This application claims priority to and the benefit of Korean Patent Application No. 10-2009-0093802, filed in the Korean Intellectual Property Office on Oct. 1, 2009, and Korean Patent Application No. 10-2010-0088327, filed in the Korean Intellectual Property Office on Sep. 9, 2010, the entire content of each of which is incorporated herein by reference.

BACKGROUND

1. Field

Aspects of embodiments of the present invention relate to a secondary battery and a method of fabricating the secondary battery.

2. Description of the Related Art

With the trend of light weight and high functionality of portable electronic devices such as video cameras, mobile phones, and portable computers, research is being actively carried out on secondary batteries functioning as driving power sources of portable wireless devices. For example, secondary batteries include nickel-cadmium batteries, nickel-hydrogen batteries, nickel-zinc batteries, and lithium ion batteries. Of these, the lithium secondary batteries are rechargeable and adapted for miniaturization and high capacity. In addition, since the lithium secondary batteries have high operation voltages and high energy density per unit weight, the lithium secondary batteries are widely used in high-end electronic devices.

Such a lithium ion battery may have the configuration of a battery pack that includes a battery cell, a circuit module, and a cover. The battery cell includes an electrode assembly, a can, and a cap assembly. The electrode assembly includes a positive electrode plate, a negative electrode plate, and a separator. The can accommodates the electrode assembly. The cap assembly seals the can. The circuit module includes a protective circuit device and is coupled to the battery cell. The cover covers the circuit module.

SUMMARY

According to aspects of embodiments of the present invention, an improved secondary battery and a method of fabricating the secondary battery are provided.

According to aspects of embodiments of the present invention, an electrode assembly of a secondary battery and a method of fabricating the electrode assembly of the secondary battery prevent or substantially prevent an electrode plate from being damaged when an electrode tab is coupled to the electrode plate.

According to one embodiment of the present invention, an electrode assembly of a secondary battery includes: a first electrode plate, a second electrode plate, and a separator between the first and second electrode plates, the first electrode plate including a first electrode collector and a first electrode tab coupled thereto, and the second electrode plate including a second electrode collector and a second electrode tab coupled thereto; and a protective member surrounding an end of at least one of the first and second electrode tabs, and a portion of the at least one of the first and second electrode tabs is exposed from the protective member and is coupled to a non-coating portion of a respective one of the first and second electrode plates.

The protective member may have a welding hole exposing the portion of the at least one of the first and second electrode tabs for welding the one of the first and second electrode tabs.

The electrode assembly may include an adhesive on a surface of the protective member for adhering the protective member to the electrode collector of the respective one of the first and second electrode plates.

The protective member may surround an edge of a surface of the at least one of the first and second electrode tabs that is facing the electrode collector of the respective one of the first and second electrode plates.

In one embodiment, the protective member includes a first protective member on an upper portion of the at least one of the first and second electrode tabs; and a second protective member coupled to a lower portion of the first protective member and surrounding the at least one of the first and second electrode tabs between the first and second protective members.

The protective member may be formed of a tape or may be formed by molding.

The protective member may have a curved surface at a corner coupled to the non-coating portion.

In one embodiment, the electrode assembly has a jelly roll shape in which the first electrode plate, the separator, and the second electrode plate are stacked and wound, and the first electrode tab is spaced apart from the second electrode tab.

In one embodiment, the electrode assembly further includes at least one another first electrode plate, at least one another separator, and at least one another second electrode plate, the electrode assembly has a stack structure in which the first electrode plates, the separators, and the second electrode plates are stacked, and the first electrode tabs of the first electrode plates are connected together to form a first electrode terminal, and the second electrode tabs of the second electrode plates are connected together to form a second electrode terminal.

In one embodiment, the first electrode terminal is formed by bending one of the first electrode tabs to surround the at least one other of the first electrode tabs, and the second electrode terminal is formed by bending one of the second electrode tabs to surround the at least one other of the second electrode tabs The bent tabs may be the uppermost or lowermost one of the first electrode tabs and the uppermost or lowermost one of the second electrode tabs.

The bent tabs may have lengths greater than respective lengths of the at least one other of the first electrode tabs and the at least one other of the second electrode tabs.

The bent tabs may have thicknesses greater than respective thicknesses of the at least one other of the first electrode tabs and the at least one other of the second electrode tabs.

According to another embodiment of the present invention, a method of fabricating an electrode assembly of a secondary battery, the electrode assembly including a first electrode plate, a second electrode plate, and a separator between the first and second electrode plates, the first electrode plate including a first electrode collector and a first electrode tab coupled thereto, and the second electrode plate including a second electrode collector and a second electrode tab coupled thereto, includes: preparing the first electrode tab, the second electrode tab, and a protective member surrounding an end of one of the first and second electrode tabs; welding a portion of the one of the first and second electrode tabs that is exposed from the protective member to a non-coating portion of a respective one of the first and second electrode plates; and sequentially stacking the first electrode plate, the separator, and the second electrode plate.

In preparing the first and second electrode tabs and the protective member, a welding hole may be formed in a surface of the protective member.

Welding the one of the first and second electrode tabs may be performed at an upper portion of the protective member through the welding hole.

In preparing the first and second electrode tabs and the protective member, the protective member may be formed of a tape or may be formed by molding.

In preparing the first and second electrode tabs and the protective member, the protective member may have a curved surface at a corner of a portion surrounding the end of the one of the first and second electrode tabs.

In preparing the first and second electrode tabs and the protective member, the protective member surrounds an edge of a surface of the at least one of the first and second electrode tabs that is facing the electrode collector of the respective one of the first and second electrode plates.

In preparing the first and second electrode tabs and the protective member, the protective member may include a first protective member on an upper portion of the at least one of the first electrode tab and the second electrode tab, and a second protective member on a lower portion of the first protective member and surrounding the at least one of the first electrode tab and the second electrode tab between the first and second protective members.

The method may further include, after stacking the first electrode plate, the separator, and the second electrode plate, winding the first electrode plate, the separator, and the second electrode plate to form the electrode assembly.

The method may further include, after stacking the first electrode plate, the separator, and the second electrode plate: preparing at least one another first electrode plate, at least one another second electrode plate, and at least one another separator and stacking the first electrode plates, the separators, and the second electrode plates; and connecting the first electrode tabs of the first electrode plates together to form a first electrode terminal, and connecting the second electrode tabs of the second electrode plates together to form a second electrode terminal.

The forming of the electrode terminals may include: bending one of the first electrode tabs to surround the at least one other of the first electrode tabs; and bending one of the second electrode tabs to surround the at least one other of the second electrode tabs.

Forming the electrode terminals may include bending the uppermost or lowermost one of the first electrode tabs and the uppermost or lowermost one of the second electrode tabs.

Forming the electrode terminals may include bending the first electrode tab having a length greater than that of the at least one other of the first electrode tabs and the second electrode tab having a length greater than that of the at least one other of the second electrode tabs.

The forming of the electrode terminals may include bending the first electrode tab having a thickness greater than that of the at least one other of the first electrode tabs and the second electrode tab having a thickness greater than that of the at least one other of the second electrode tabs.

BRIEF DESCRIPTION OF THE DRAWINGS

The above and other features and advantages of embodiments of the present invention will become more apparent to those of ordinary skill in the art by describing in detail some exemplary embodiments of the present invention with reference to the attached drawings, in which.

DETAILED DESCRIPTION

Figure 1A:
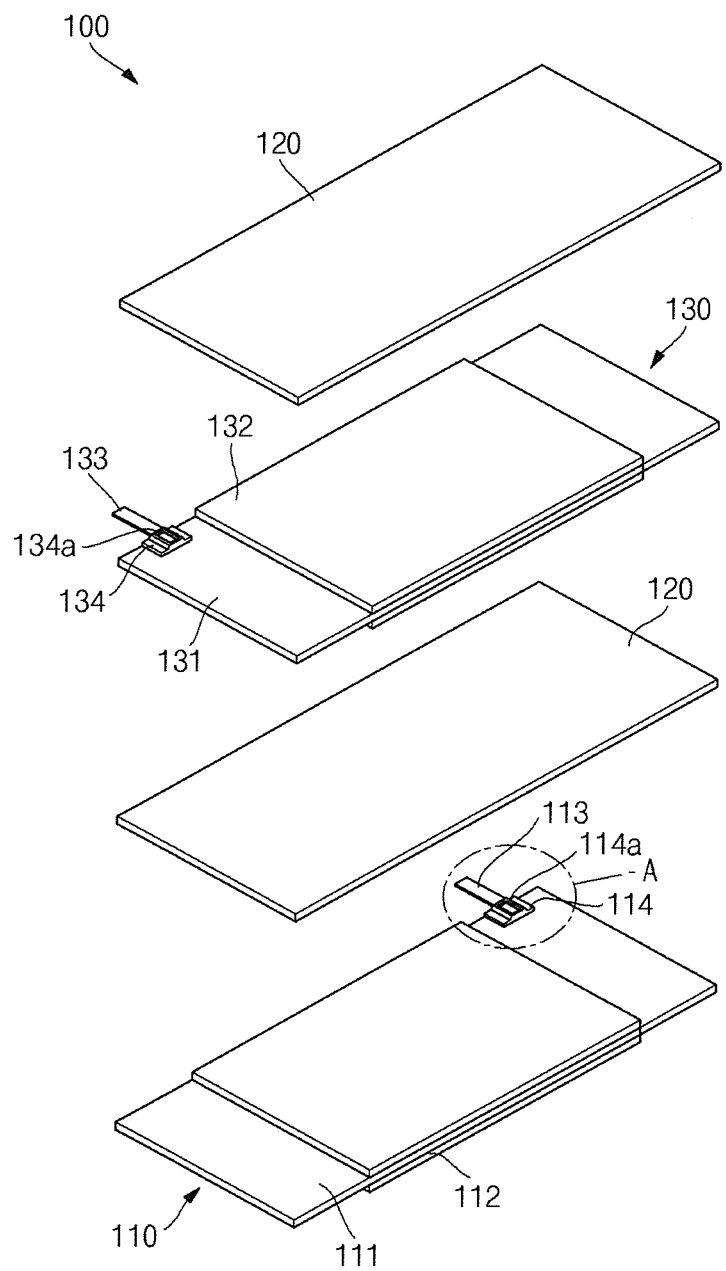
FIG. 1A is an exploded perspective view of an electrode assembly used in a secondary battery according to an embodiment of the present invention.

Some exemplary embodiments will now be described more fully hereinafter with reference to the accompanying drawings; however, embodiments of the present invention may be embodied in different forms and should not be construed as limited to the embodiments set forth herein. Rather, these exemplary embodiments are provided by way of example for understanding of the invention and to convey the scope of the invention to those skilled in the art. Like reference numerals denote like elements throughout.

Hereinafter, some exemplary embodiments will be described in detail with reference to the accompanying drawings.

Figure 1B:
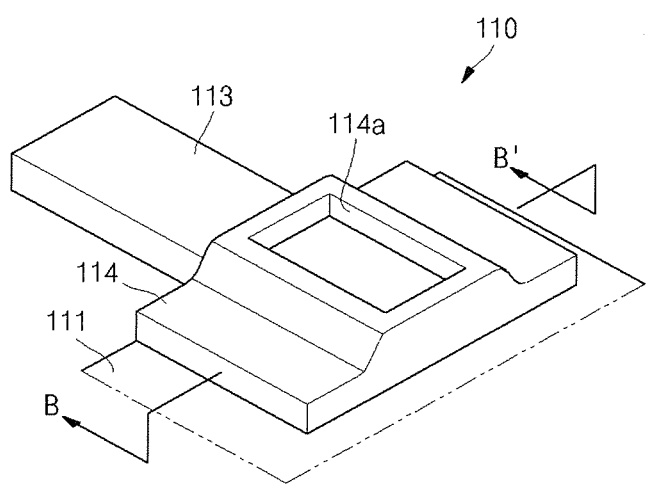
FIG. 1B is an enlarged view illustrating a region "A" of an electrode plate of the electrode assembly of FIG. 1A.
Figure 1C:
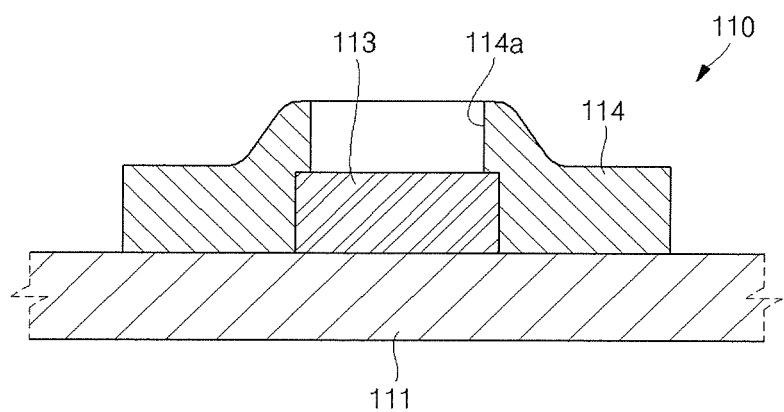
FIG. 1C is a partial cross-sectional view of the electrode plate of FIG. 1B taken along line B-B'.

FIG. 1A is an exploded perspective view of an electrode assembly 100 used in a secondary battery according to an embodiment of the present invention. FIG. 1B is an enlarged view illustrating a region "A" of a first electrode plate 110 of the electrode assembly 100 of FIG. 1A. FIG. 1C is a partial cross-sectional view of the first electrode plate 110 of FIG. 1B taken along line B-B'.

Referring to FIGS. 1A through 1C, the electrode assembly 100 used in the secondary battery according to one embodiment of the present invention includes the first electrode plate 110 (e.g., a positive electrode plate), separators 120, and a second electrode plate 130 (e.g., a negative electrode plate).

The first electrode plate 110, one of the separators 120, the second electrode plate 130, and another one of the separators 120, in one embodiment, are sequentially stacked and wound in a jelly roll shape, so as to form the electrode assembly 100. The electrode assembly 100 is wound such that a first electrode tab 113 (e.g., a positive electrode tab) of the first electrode plate 110 and a second electrode tab 133 (e.g., a negative electrode tab) of the second electrode plate 130 protrude upward, which will be described later. In one embodiment, the electrode assembly 100 may be wound such that the first electrode tab 113 of the first electrode plate 110 is spaced apart from the second electrode tab 133 of the second electrode plate 130.

Hereinafter, the first electrode plate 110 and the second electrode plate 130 may be referred to as electrode plates, and the first electrode tab 113 of the first electrode plate 110 and the second electrode tab 133 of the second electrode plate 130 may be referred to as electrode tabs.

The first electrode plate 110 includes a first electrode collector 111 (e.g., a positive electrode collector), first electrode coating portions 112 (e.g., positive electrode coating portions) disposed on one or more surfaces of the first electrode collector 111, the first electrode tab 113 coupled to a surface of the first electrode collector 111, and a protective member 114 surrounding an end of the first electrode tab 113.

The first electrode collector 111, in one embodiment, has a thin layer shape and is configured to collect electrons generated through a chemical reaction and deliver the electrons to an external circuit. The first electrode collector 111 may be formed of stainless steel, nickel, aluminum, titanium, or an alloy thereof, or may be formed of aluminum or stainless steel having a surface treated with carbon, nickel, titanium, or silver.

One or more surfaces of the first electrode collector 111 are coated with the first electrode coating portions 112. The first electrode coating portions 112 may be formed of material, inserting or extracting lithium ions, such as one or more composite oxides of lithium and at least one of cobalt, manganese, and nickel. Portions of the first electrode collector 111 disposed outside of the first electrode coating portions 112 form non-coating portions.

The first electrode tab 113 is coupled to the non-coating portion of the first electrode collector 111. For example, the first electrode tab 113 may be coupled to the non-coating portion through laser or resistance welding. The first electrode tab 113, in one embodiment, is formed of aluminum or aluminum alloy and is configured to deliver electrons collected in the first electrode collector 111 to an external circuit.

The protective member 114 surrounds the end of the first electrode tab 113. Particularly, the end surrounded by the protective member 114 includes the lower edge of the first electrode tab 113. The protective member 114 may be formed of a tape or may be formed by molding. The protective member 114 further surrounds corners of the first electrode tab 113 welded to the first electrode collector 111. In addition, the protective member 114 further surrounds at least one portion of the first electrode tab 113 facing the second electrode plate 130. Thus, the protective member 114 insulates the first electrode tab 113 from the second electrode plate 130 facing the first electrode tab 113, and protects the first electrode collector 111 from the first electrode tab 113, particularly, from the end of the first electrode tab 113. That is, the protective member 114 surrounds relatively sharp edges and corners of the first electrode tab 113 to protect the first electrode collector 111 from the edges and corners of the first electrode tab 113. In one embodiment, the protective member 114 may be formed of polymer resin such as polyester having an electrically insulative property and elasticity.

The protective member 114 includes a welding hole 114a passing through an inner surface to another surface. An adhesive may be applied to the lower surface of the protective member 114. In the state where the protective member 114 surrounds the end of the first electrode tab 113, the protective member 114 is adhered to the first electrode collector 111, and the first electrode collector 111 may be exposed through the welding hole 114a. The first electrode tab 113 may be welded to the first electrode collector 111 through the welding hole 114a. Although, in one embodiment, the welding hole 114a has a closed shape, in another embodiment, the welding hole 114a may have an open side to increase a welding area.

Thus, since the first electrode tab 113 is attached to the first electrode collector 111 in the state where the protective member 114 is attached to the first electrode tab 113, deformation of the first electrode collector 111 due to a welding process for the first electrode tab 113 and an attaching process for the protective member 114 can be prevented or reduced. Since the protective member 114 reduces direct contact between the first electrode collector 111 and the first electrode tab 113, deformation of the first electrode collector 111 due to the welding process for the first electrode tab 113 is prevented or reduced.

The separator 120 is disposed between the first electrode plate 110 and the second electrode plate 130. The separator 20 is configured to prevent or substantially prevent a short circuit between the first electrode plate 110 and the second electrode plate 130 and provide a passage through which lithium ions pass. In one embodiment, the separator 120 is formed of a thermoplastic resin, such as polyethylene or polypropylene, or any other suitable material, and has a porous membrane structure. When the inner temperature of the secondary battery reaches the melting point of the thermoplastic resin, the separator 120 having a porous membrane structure is melted to clog pores, so that the separator 120 functions as an insulating film. This prevents or substantially prevents lithium ions from passing between the first electrode plate 110 and the second electrode plate 130 to stop charging or discharging, so that a current does not flow, thus stopping an inner temperature increase of the secondary battery.

The second electrode plate 130 includes a second electrode collector 131 (e.g., a negative electrode collector), second electrode coating portions 132 (e.g., negative electrode coating portions) disposed on one or more surfaces of the second electrode collector 131, the second electrode tab 133 coupled to a surface of the second electrode collector 131, and a protective member 134 surrounding an end of the second electrode tab 133.

The second electrode collector 131, in one embodiment, has a thin layer shape, similar to the first electrode collector 111. The second electrode collector 131, in one embodiment, is formed of copper or a copper alloy, or any other suitable material.

One or more surfaces of the second electrode collector 131 are coated with the second electrode coating portions 132. The second electrode coating portions 132 may be formed of material, inserting or extracting lithium ions, such as lithium metal, lithium alloy, or carbon material including crystalline carbon, amorphous carbon, carbon composite, and carbon fiber. Portions of the second electrode collector 131 disposed outside of the second electrode coating portions 132 form non-coating portions.

The second electrode tab 133 is coupled to the non-coating portion of the second electrode collector 131. For example, the second electrode tab 133 may be coupled to the non-coating portion through laser or resistance welding. In one embodiment, the second electrode tab 133 is formed of copper or nickel and is configured to deliver electrons collected in the second electrode collector 131 to an external circuit.

The protective member 134 surrounds the end of the second electrode tab 133. Particularly, the end surrounded by the protective member 134 includes the lower edge of the second electrode tab 133. The protective member 134 further surrounds corners of the second electrode tab 133 welded to the second electrode collector 131. In addition, the protective member 134 further surrounds a portion of the second electrode tab 113 facing the first electrode plate 110. Thus, the protective member 134 insulates the second electrode tab 133 from the first electrode plate 110, and protects the second electrode collector 131 from the second electrode tab 133, particularly, from the end of the second electrode tab 133. That is, the protective member 134 surrounds relatively sharp edges and corners of the second electrode tab 133 to protect the second electrode collector 131 from the edges and corners of the second electrode tab 133. To this end, the protective member 134 may be formed of a polymer resin, such as polyester. An adhesive layer may be disposed on the lower surface of the protective member 134, and a welding hole 134a is disposed in the protective member 134, similar to the welding hole 114a of the protective member 114. The second electrode tab 133 may be welded in the state where the second electrode tab 133 and the protective member 134 are attached to the second electrode collector 131.

Thus, as described above with respect to the first electrode tab 113, deformation of the second electrode collector 131 due to two stages of a welding process for the second electrode tab 133 and an attaching process for the protective member 134 can be prevented or reduced. When the second electrode tab 133 is welded, the protective member 134 protects the second electrode collector 131 to prevent or reduce deformation of the second electrode collector 131.

The configuration of an electrode assembly of a secondary battery will now be described according to another embodiment of the present invention.

Figure 2:
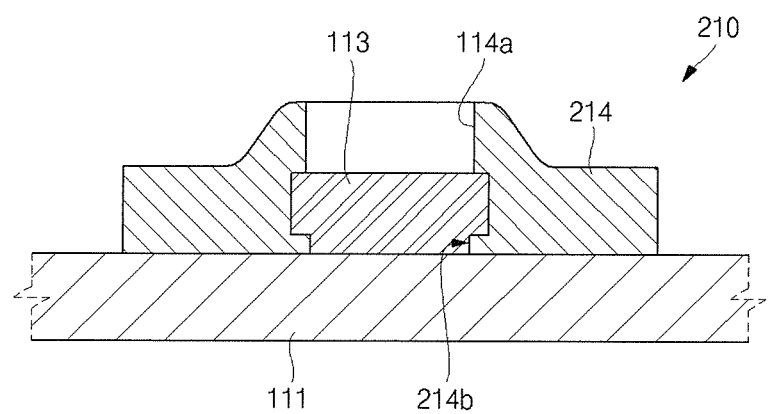
FIG. 2 is a partial cross-sectional view of an electrode plate of an electrode assembly used in a secondary battery according to another embodiment of the present invention.

FIG. 2 is a partial cross-sectional view of an electrode plate of an electrode assembly used in a secondary battery according to another embodiment of the present invention.

Referring to FIG. 2, an electrode assembly used in a secondary battery according to one embodiment includes a first electrode plate 210 (e.g., a positive electrode plate), a separator (not shown), and a second electrode plate (e.g., a negative electrode plate) (not shown). The separator may be the same or substantially the same as that of the electrode assembly 100 described above. The second electrode plate may have a configuration the same or substantially the same as that of the first electrode plate 210 except for material, and the materials may be the same as those described above with respect to the electrode assembly 100 described above. Like reference numerals denote like elements throughout. Hereinafter, only those elements which differ from the corresponding elements of the electrode assembly 100 described above will be described in detail. That is, description of elements of the first electrode plate 210 which are the same or substantially the same as corresponding elements of the electrode assembly 100 described above will not be repeated.

The first electrode plate 210 includes the first electrode collector 111, a first electrode coating portion (e.g., a positive electrode coating portion) (not shown), the first electrode tab 113, and a protective member 214 surrounding the end of the first electrode tab 113.

The protective member 214 insulates the first electrode tab 113 and protects the first electrode collector 111 from the first electrode tab 113, particularly, from the end of the first electrode tab 113.

The welding hole 114a is disposed in the protective member 214. An adhesive may be disposed on the lower surface of the protective member 214. Thus, the first electrode tab 113 may be welded to the first electrode collector 111 through the welding hole 114a.

The protective member 214 includes a lower protective region 214b disposed in a lower portion of the first electrode tab 113. The lower protective region 214b surrounds the lower surface disposed at edges of the first electrode tab 113. Thus, the protective member 214 protects the first electrode collector 111 from the corners of the end of the first electrode tab 113 to prevent or substantially prevent damage of the first electrode collector 111 due to the first electrode tab 113.

The configuration of an electrode assembly of a secondary battery will now be described according to another embodiment of the present invention.

Figure 3:
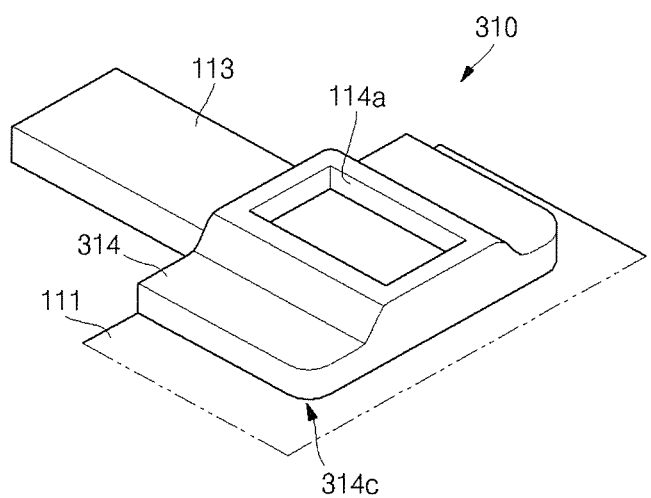
FIG. 3 is a partial perspective view of an electrode plate of an electrode assembly used in a secondary battery according to another embodiment of the present invention.

FIG. 3 is a partial perspective view of an electrode plate of an electrode assembly used in a secondary battery according to another embodiment of the present invention.

Referring to FIG. 3, an electrode assembly used in a secondary battery includes a first electrode plate 310 (e.g., a positive electrode plate), a separator (not shown), and a second electrode plate (e.g., a negative electrode plate) (not shown). The second electrode plate may have a configuration the same or substantially the same as that of the first electrode plate 310 except for material, and the materials may be the same as those described above with respect to the electrode assembly 100 described above. Like reference numerals denote like elements throughout. Hereinafter, only those elements which differ from the corresponding elements of the electrode assembly 100 described above will be described in detail. That is, description of elements of the first electrode plate 310 which are the same or substantially the same as corresponding elements of the electrode assembly 100 described above will not be repeated.

The first electrode plate 310 includes the first electrode collector 111, a first electrode coating portion (e.g., a positive electrode coating portion) (not shown), the first electrode tab 113, and a protective member 314 surrounding the end of the first electrode tab 113.

The protective member 314 insulates the first electrode tab 113 and protects the first electrode collector 111 from the end of the first electrode tab 113.

The welding hole 114a is disposed in the protective member 314. An adhesive may be disposed on a lower surface of the protective member 314. Thus, the first electrode tab 113 may be welded to the first electrode collector 111 through the welding hole 114a.

The protective member 314 has curved surfaces 314c in a portion coupled to the first electrode collector 111. That is, the corners of the end of the protective member 314 contacting the first electrode collector 111 have the curved surfaces 314c. Thus, the protective member 314 protects the first electrode collector 111 from the end of the first electrode tab 113 and from the corners of the end of the protective member 314.

The configuration of an electrode assembly of a secondary battery will now be described according to another embodiment of the present invention.

Figure 4:
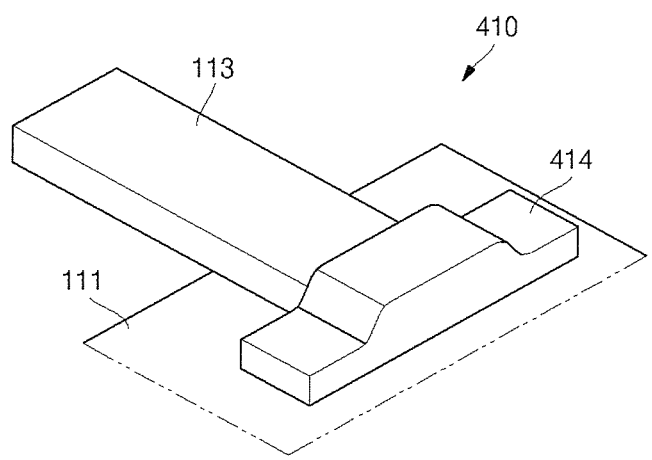
FIG. 4 is a partial perspective view of an electrode plate of an electrode assembly used in a secondary battery according to another embodiment of the present invention.

FIG. 4 is a partial perspective view of an electrode plate of an electrode assembly used in a secondary battery according to another embodiment of the present invention.

Referring to FIG. 4, an electrode assembly used in the secondary battery includes a first electrode plate 410 (e.g., a positive electrode plate), a separator (not shown), and a second electrode plate (e.g., a negative electrode plate) (not shown). The second electrode plate may have a configuration the same or substantially the same as that of the first electrode plate 410 except for material, and the materials may be the same as those described above with respect to the electrode assembly 100 described above. Like reference numerals denote like elements throughout. Hereinafter, only those elements which differ from the corresponding elements of the electrode assembly 100 described above will be described in detail. That is, description of elements of the first electrode plate 410 which are the same or substantially the same as corresponding elements of the electrode assembly 100 described above will not be repeated.

The first electrode plate 410 includes the first electrode collector 111, a first electrode coating portion (e.g., a positive electrode coating portion) (not shown), the first electrode tab 113, and a protective member 414 surrounding the end of the first electrode tab 113.

The protective member 414 surrounds only an end disposed in the area of the first electrode tab 113 coupled to the first electrode collector 111. That is, the protective member 414 is disposed on the inside of the first electrode collector 111 to expose a portion of the first electrode tab 113 overlapping the first electrode collector 111. Thus, the first electrode tab 113 may be welded to the first electrode collector 111 through the exposed portion. Although not shown, the protective member 414 may include a welding hole, which may increase a welding area.

A configuration of an electrode assembly of a secondary battery will now be described according to another embodiment of the present invention.

Figure 5:
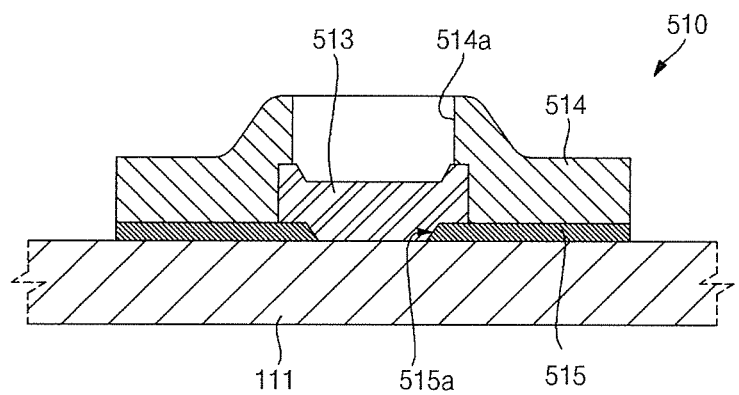
FIG. 5 is a partial perspective view of an electrode plate of an electrode assembly used in a secondary battery according to another embodiment of the present invention.

FIG. 5 is a partial perspective view of an electrode plate of an electrode assembly used in a secondary battery according to another embodiment of the present invention.

Referring to FIG. 5, according to one embodiment, the electrode assembly used in the secondary battery includes a positive electrode plate 510, a separator (not shown), and a negative electrode plate (not shown).

The positive electrode plate 510 includes the positive electrode collector 111, a positive electrode coating portion (not shown), a positive electrode tab 513, and protective members 514 and 515 surrounding an end of the positive electrode tab 513.

The positive electrode tab 513 is coupled to the non-coating portion of the positive electrode collector 111. The positive electrode tab 513 may be coupled to the non-coating portion through laser or resistance welding. First, the lower surface of the positive electrode tab 513 is surrounded by the protective member 515, and then the positive electrode tab 513 is placed on the non-coating portion of the positive electrode collector 111, and then is coupled to the non-coating portion through welding. At least a portion of the positive electrode tab 513 is disposed to be spaced apart from the upper surface of the non-coating portion by the thickness of the protective member 515, and is coupled to the non-coating portion through welding.

The protective members 514 and 515 surround the end of the positive electrode tab 513. The protective members 514 and 515 include a first protective member 514 disposed on an upper portion of the positive electrode tab 513, and a second protective member 515 disposed on a lower portion of the positive electrode tab 513.

The positive electrode tab 513 is placed on the upper portion of the second protective member 515, then the upper portion of the positive electrode tab 513 is covered with the first protective member 514, and then the positive electrode tab 513 is placed on the upper portion of the positive electrode collector 111. The first and second protective members 514 and 515, in one embodiment, are coupled to each other through adhesive with the positive electrode tab 513 therebetween.

The positive electrode tab 513 is welded through a welding hole 514a formed in the first protective member 514, and the positive electrode tab 513 is coupled to the non-coating portion through a welding hole 515a of the second protective member 515. In one embodiment, prior to welding, the lower surface of the second protective member 515 may not be adhered to the non-coating portion of the positive electrode collector 111. This is because the second protective member 515 may be coupled to the non-coating portion of the positive electrode collector 111 during the welding. However, the welding may be performed after the lower of the second protective member 515 is adhered to the non-coating portion, to dispose the first and second protective members 514 and 515 at a predetermined position.

A configuration of an electrode assembly of a secondary battery will now be described according to another embodiment of the present invention.

Figure 6:
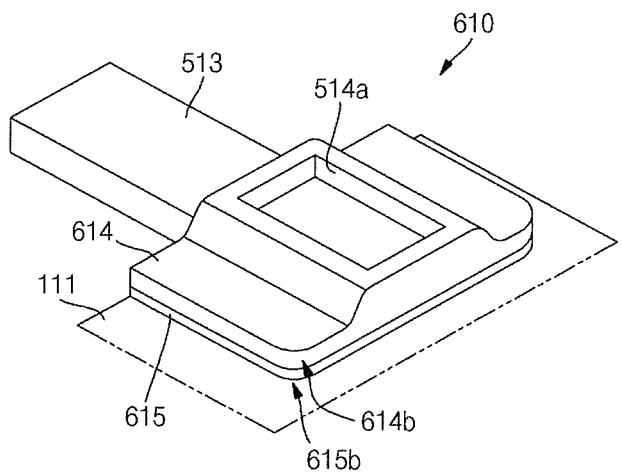
FIG. 6 is a partial perspective view of an electrode plate of an electrode assembly used in a secondary battery according to another embodiment of the present invention.

FIG. 6 is a partial perspective view of an electrode plate of an electrode assembly used in a secondary battery according to another embodiment of the present invention.

Referring to FIG. 6, the electrode assembly used in the secondary battery includes a positive electrode plate 610, a separator (not shown), and a negative electrode plate (not shown).

The positive electrode plate 610 includes the positive electrode collector 111, a positive electrode coating portion (not shown), the positive electrode tab 513, and protective members 614 and 615 surrounding an end of the positive electrode tab 513.

The protective members 614 and 615 are substantially similar to the protective members 514 and 515 of the positive electrode plate 510 described above. However, portions of the protective members 614 and 615 coupled to the positive electrode collector 111 have curved surfaces 614b and 615b. That is, the protective members 614 and 615 have the curved surfaces 614b and 615b instead of the edges of the ends contacting the positive electrode collector 111. Thus, since the edges are removed from the protective members 614 and 615, the positive electrode collector 111 is protected from the ends of the positive electrode tab 513 and the edges of the ends of the protective members 614 and 615.

A configuration of an electrode assembly of a secondary battery will now be described according to another embodiment of the present invention.

Figure 7A:
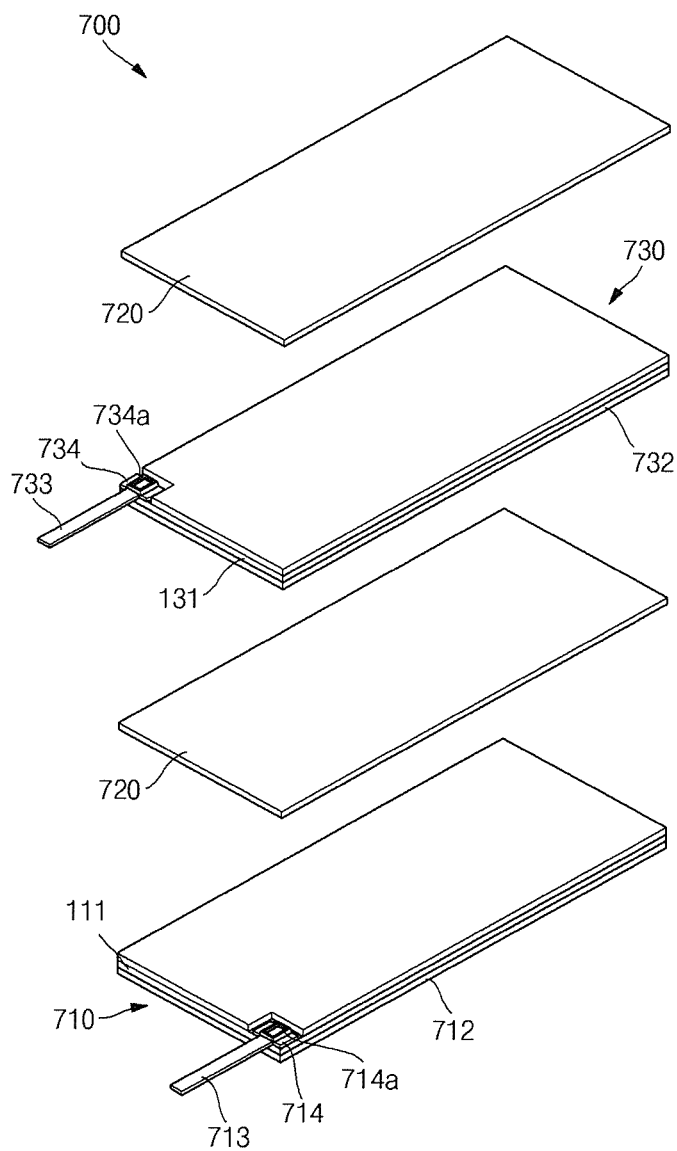
FIG. 7A is an exploded perspective view of an electrode assembly used in a secondary battery according to another embodiment of the present invention.
Figure 7B:
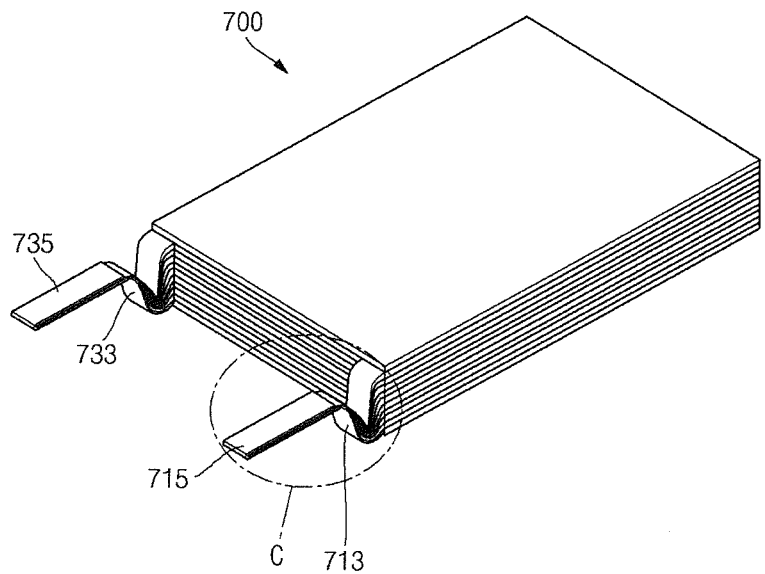
FIG. 7B is a perspective view of the electrode assembly of FIG. 7A shown in an assembled state.
Figure 7C:
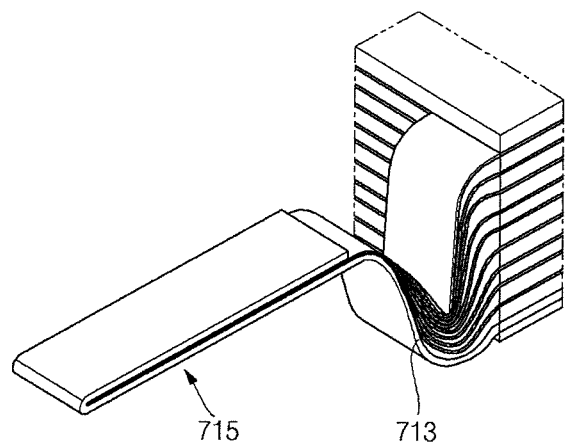
FIG. 7C is an enlarged view illustrating a region "C" of the electrode assembly of FIG. 7B.

FIG. 7A is an exploded perspective view of an electrode assembly 700 used in a secondary battery according to another embodiment of the present invention. FIG. 7B is a perspective view of the electrode assembly 700 shown in an assembled state. FIG. 7C is an enlarged view illustrating a region "C" of the electrode assembly 700 of FIG. 7B.

Referring to FIGS. 7A through 7C, the electrode assembly 700 used in a secondary battery according to one embodiment includes first electrode plates 710 (e.g., positive electrode plates), separators 720, and second electrode plates 730 (e.g., negative electrode plates). The electrode assembly 700 has a stack structure. That is, the first electrode plates 710, the separators 720, and the second electrode plates 730 are sequentially stacked to form the electrode assembly 700.

In one embodiment, each of the first electrode plates 710 includes the first electrode collector 111, first electrode coating portions 712 (e.g., positive electrode coating portions) disposed on one or more surfaces of the first electrode collector 111, a first electrode tab 713 (e.g., a positive electrode tab) coupled to a surface of the first electrode collector 111, a protective member 714 surrounding a first end of the first electrode tab 713, and a first terminal 715 (e.g., a positive terminal) disposed at a second end (e.g., an end opposite the first end) of the first electrode tab 713.

In one embodiment, a first surface of the first electrode collector 111 except for a portion to which the first electrode tab 713 is coupled, and a second surface of the first electrode collector 111 are entirely coated with the first electrode coating portions 712. The portion of the first electrode collector 111 disposed outside of the first electrode coating portions 712 forms a non-coating portion. Thus, the amount of coating portions formed on the first electrode plates 710 is increased or maximized, and the capacity of the secondary battery is thereby increased. The first electrode coating portions 712 may be formed of a material, inserting or extracting lithium ions, such as one or more composite oxides of lithium and at least one of cobalt, manganese, and nickel. In one embodiment, horizontal positions of the first electrode plates 710 where the first electrode coating portions 712 are disposed are the same or substantially the same, and horizontal positions of the first electrode plates 710 where the non-coating portions are disposed are the same or substantially the same.

The first electrode tab 713 may be formed of aluminum, or any other suitable material, and is coupled to the non-coating portion of the first electrode collector 111. The first electrode tabs 713, in one embodiment, are welded to the non-coating portions at the same or substantially the same horizontal positions. That is, the first electrode tabs 713 may be arrayed along a vertical straight line.

The protective member 714, surrounding an end of the first electrode tab 713, insulates the first electrode tab 713 and protects the first electrode collector 111 from the end of the first electrode tab 713.

A welding hole 714a is disposed in the protective member 714. Thus, the first electrode tab 713 may be welded to the first electrode collector 111 through the welding hole 714a.

Thus, since a welding process is performed in the state where the first electrode tab 713, together with the protective member 714, is attached to the first electrode collector 111, two stages of deformation due to the welding process for the first electrode tab 713 and an attaching process for the protective member 714 can be prevented or reduced. When the first electrode tab 713 is welded, the protective member 714 protects the first electrode collector 111 to prevent or reduce deformation of the first electrode collector 111.

The first terminal 715, in one embodiment, is formed by bending the second end of the first electrode tab 713. That is, an uppermost or lowermost one of the first electrode tabs 713 of the stacked first electrode plates 710 is bent to surround the others of the first electrode tabs 713, and the welding process is performed to form the first terminal 715. That is, since the first terminal 715 is formed by bending the first electrode tab 713 without an additional structure, a cost of the secondary battery is reduced, and improved coupling of the first terminal 715 is achieved. The first electrode tab 713 forming the first terminal 715 (i.e. the bent first electrode tab 713) may have a greater length and/or a greater thickness than the other first electrode tabs 713.

The separators 720 are stacked between the first electrode plates 710 and the second electrode plates 730. The separators 720 are configured to prevent or substantially prevent a short circuit between the first electrode plate 710 and the second electrode plate 730 and allow the passing of lithium ions.

In one embodiment, each of the second electrode plates 730 includes the second electrode collector 131, second electrode coating portions 732 (e.g., negative electrode coating portions) disposed on one or more surfaces of the second electrode collector 131, a second electrode tab 733 (e.g., a negative electrode tab) coupled to a first surface of the second electrode collector 131, a protective member 734 surrounding a first end of the second electrode tab 733, and a second terminal 735 (e.g., a negative terminal) disposed in a second end (e.g., an end opposite the first end) of the second electrode tab 733.

The second electrode coating portions 732, in one embodiment, are formed on one or more surfaces of the second electrode collector 131 through coating. For example, in one embodiment, the first surface of the second electrode collector 131 except for a portion to which the second electrode tab 733 is coupled, and a second surface of the second electrode collector 131 are entirely coated with the second electrode coating portions 732. The portion of the second electrode collector 131 disposed outside of the second electrode coating portions 732 forms a non-coating portion. Thus, the amount of coating portions formed on the second electrode plate 730 is increased or maximized, and the capacity of the secondary battery is thereby increased. In one embodiment, horizontal positions of the second electrode plates 730 where the second electrode coating portions 732 are disposed are the same or substantially the same, and horizontal positions of the second electrode plates 730 where the non-coating portions are disposed are the same or substantially the same.

The second electrode tabs 733 may be formed of nickel, or any other suitable material, and are coupled to the non-coating portions of the second electrode collector 131. In one embodiment, horizontal positions of the second electrode plates 730 where the second electrode tabs 733 are disposed are the same or substantially the same. That is, the second electrode tabs 733 may be arrayed along a vertical straight line. The second electrode tabs 733 are horizontally spaced apart from the first electrode tabs 713.

The protective member 734, surrounding the first end of the second electrode tab 733, insulates the second electrode tab 733 and protects the second electrode collector 131 from the first end of the second electrode tab 733.

A welding hole 734a is disposed in the protective member 734. Thus, the second electrode tab 733 may be welded to the second electrode collector 131 through the welding hole 734a.

Thus, since a welding process is performed in the state where the second electrode tab 733, together with the protective member 734, is attached to the second electrode collector 131, two-stage deformation of the second electrode collector 131 due to the welding process for the second electrode tab 733 and an attaching process for the protective member 734 can be prevented or reduced. When the second electrode tab 733 is welded, the protective member 734 protects the second electrode collector 131 to prevent or reduce deformation of the second electrode collector 131.

The second terminal 735, in one embodiment, is formed by bending the second end of the second electrode tab 733. That is, an uppermost or lowermost one of the second electrode tabs 733 of the stacked second electrode plates 730 is bent to surround the others of the second electrode tabs 733, and the welding process is performed to form the second terminal 735. That is, since the second terminal 735 is formed by bending the second electrode tab 733 without an additional structure, a cost of the secondary battery is reduced, and improved coupling of the second terminal 735 is achieved. The second electrode tab 733 forming the second terminal 735 (i.e. the bent first electrode tab 713) may have a greater length and/or a greater thickness than the other second electrode tabs 733.

A method of fabricating an electrode assembly of a secondary battery will now be described according to an embodiment of the present invention.

Figure 8:
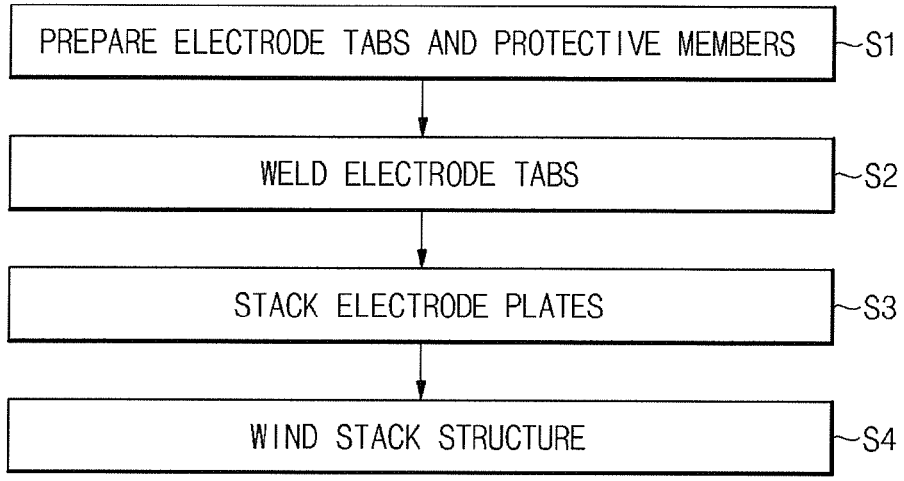
FIG. 8 is a flowchart illustrating a method of fabricating an electrode assembly of a secondary battery according to an embodiment of the present invention.

FIG. 8 is a flowchart illustrating a method of fabricating an electrode assembly of a secondary battery according to an embodiment of the present invention.

Referring to FIG. 8, a method of fabricating an electrode assembly of a secondary battery includes an operation S1 of preparing electrode tabs and protective members, an operation S2 of welding the electrode tabs, a stacking operation S3, and a winding operation S4. The operations S1 through S4 of FIG. 8 will now be described with reference to FIGS. 1A through 1C.

In the operation S1, the first electrode tab 113, the protective member 114 surrounding the first electrode tab 113, the second electrode tab 133, and the protective member 134 surrounding the second electrode tab 133 are prepared. The protective member 114 surrounds the end of the first electrode tab 113. The protective member 114 may be formed of a tape or may be formed by molding. The welding hole 114a is disposed in the protective member 114 to expose a portion of the first electrode tab 113. The protective member 134 surrounding the second electrode tab 133 has a similar configuration to that of the protective member 114. The lower surfaces of the protective members 114 and 134 may be provided with adhesive members to increase an adhering force to the first electrode collector 111 and the second electrode collector 131, respectively.

In the operation S2, the first electrode tab 113 is welded to the first electrode collector 111, and the second electrode tab 133 is welded to the second electrode collector 131. At this point, the first electrode tab 113 is welded through the welding hole 114a of the protective member 114 in the state where the first electrode tab 113, together with the protective member 114, is disposed on the non-coating portion of the first electrode collector 111. The second electrode tab 133 is welded through the welding hole 134a of the protective member 134 in the state where the second electrode tab 133, together with the protective member 134, is disposed on the non-coating portion of the second electrode collector 131. Since attaching of the protective members 114 and 134 and the welding of the first electrode tab 113 and the second electrode tab 133 are performed in a single process, deformation of the first electrode collector 111 and the second electrode collector 131 can be prevented or reduced. Furthermore, since the first electrode tab 113 and the second electrode tab 133 are welded through the welding holes 114a and 134a, the protective members 114 and 134 protect the first electrode collector 111 and the second electrode collector 131 to prevent or reduce deformation due to the welding.

In the stacking operation S3, the first electrode plate 110 coupled with the first electrode tab 113 and the protective member 114, and the second electrode plate 130 coupled with the second electrode tab 133 and the protective member 134 are stacked. At this point, the separator 120 is stacked between the first electrode plate 110 and the second electrode plate 130 on an outside of at least one of the first electrode plate 110 and the second electrode plate 130. Thus, the separator 120 prevents or substantially prevents a short circuit between the first electrode plate 110 and the second electrode plate 130 and allows the passing of lithium ions.

In the winding operation S4, a stack structure of the first electrode plate 110, the separator 120, and the second electrode plate 130 is wound. In one embodiment, the electrode assembly 100, in which the first electrode plate 110, the separator 120, and the second electrode plate 130 are sequentially stacked, is wound in a jelly roll shape. At this point, the first electrode tab 113 and the second electrode tab 133 of the electrode assembly 100 protrude upward. The first electrode tab 113 of the first electrode plate 110 may be spaced apart from the second electrode tab 133 of the second electrode plate 130.

Thereafter, in one embodiment, the electrode assembly 100 is inserted into a case or a pouch, and electrolyte is injected into the case or the pouch to form the secondary battery.

A method of fabricating an electrode assembly of a secondary battery will now be described according to another embodiment of the present invention.

Figure 9:
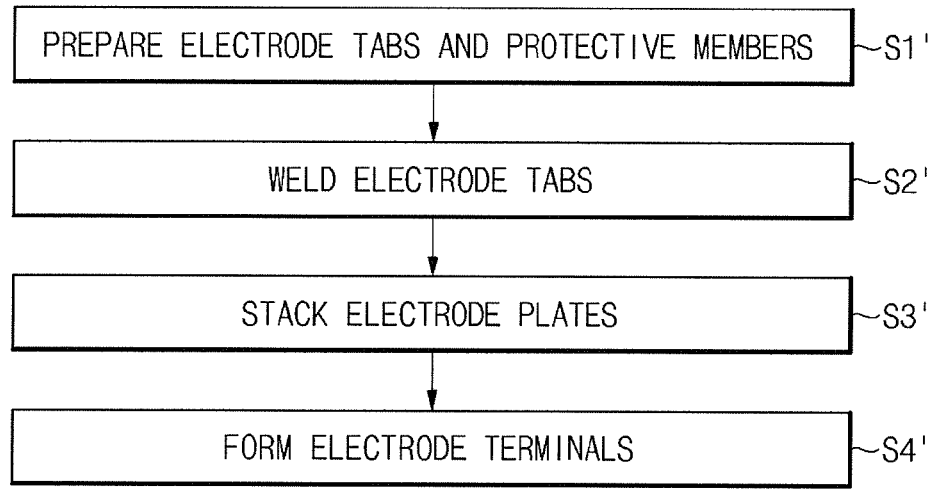
FIG. 9 is a flowchart illustrating a method of fabricating an electrode assembly of a secondary battery according to another embodiment of the present invention.

FIG. 9 is a flowchart illustrating a method of fabricating an electrode assembly of a secondary battery according to another embodiment of the present invention.

Referring to FIG. 9, a method of fabricating an electrode assembly of a secondary battery includes an operation S1' of preparing electrode tabs and protective members, an operation S2' of welding the electrode tabs, a stacking operation S3', and an operation S4' of forming electrode terminals. The operations S1' through S4' of FIG. 9 will now be described with reference to FIGS. 7A through 7C.

In the operation S1', the first electrode tab 713, the protective member 714 surrounding the first electrode tab 713, the second electrode tab 733, and the protective member 734 surrounding the second electrode tab 733 are prepared. The protective member 714 surrounds the end of the first electrode tab 713. The welding hole 714a is disposed in the protective member 714 to expose a portion of the first electrode tab 713. The protective member 734 surrounding the second electrode tab 733 has a similar configuration to that of the protective member 714.

In the operation S2', the first electrode tab 713 is welded to the first electrode collector 111, and the second electrode tab 733 is welded to the second electrode collector 131. At this point, the first electrode tab 713 is welded through the welding hole 714a of the protective member 714 in the state where the first electrode tab 713, together with the protective member 714, is disposed on the non-coating portion of the first electrode collector 111. The second electrode tab 733 is welded through the welding hole 734a of the protective member 734 in the state where the second electrode tab 733, together with the protective member 734, is disposed on the non-coating portion of the second electrode collector 131.

Since attaching of the protective members 714 and 734 and the welding of the first electrode tab 713 and the second electrode tab 733 are performed in a single process, deformation of the first electrode collector 111 and the second electrode collector 131 can be prevented or reduced. Furthermore, since the first electrode tab 713 and the second electrode tab 733 are welded through the welding holes 714a and 734a, deformation of the first electrode collector 111 and the second electrode collector 131 due to the welding can be prevented or reduced.

In the stacking operation S3', the first electrode plate 710 coupled with the first electrode tab 713 and the protective member 714, and the second electrode plate 730 coupled with the second electrode tab 733 and the protective member 734 are stacked. At this point, the separators 720 are stacked between the first electrode plate 710 and the second electrode plate 730 on outsides of the first electrode plate 710 and the second electrode plate 730. Each of the first electrode plate 710, the separator 720, and the second electrode plate 730 are provided in plurality. Horizontal positions of the first electrode plates 710, where the first electrode tabs 713 are disposed, are the same. That is, the first electrode tabs 713 are arrayed along a vertical straight line. Horizontal positions of the second electrode plates 730, where the second electrode tabs 733 are disposed, are the same. That is, the second electrode tabs 733 are arrayed along a vertical straight line.

In the operation S4', the first electrode tab 713 is bent to form the first terminal 715, and the second electrode tab 733 is bent to form the second terminal 735. The first terminal 715 is formed by bending the uppermost or lowermost one of the first electrode tabs 713, and by welding the uppermost or lowermost first electrode tab 713 with the other first electrode tabs 713. That is, since the first terminal 715 is formed by bending and welding the first electrode tab 713 without an additional structure, a cost of the secondary battery is reduced, and improved coupling of the first terminal 715 is achieved. It will be appreciated that the second terminal 735 may be formed using the second electrode tabs 733 according to the same method as that of the first terminal 715.

According to one embodiment, the protective members are coupled to the first electrode tab and the second electrode tab and disposed on the collectors, and the welding processes are performed, thereby preventing or reducing deformation of the collectors due to the welding processes and the attaching of the protective members.

According to one embodiment, the welding process is performed at the position exposed out of the protective member, so that the protective member protects the collector, thereby preventing or reducing deformation of the collector during the welding process.

Some exemplary embodiments have been described herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An electrode assembly of a secondary battery, the electrode assembly comprising:
a first electrode plate, a second electrode plate, and a separator between the first and second electrode plates, the first electrode plate including a first electrode collector and a first electrode tab coupled thereto, and the second electrode plate including a second electrode collector and a second electrode tab coupled thereto; and
a protective member covering an end of at least one of the first and second electrode tabs, the end overlapping a non-coating portion of a respective one of the first and second electrode plates,
wherein a portion of the at least one of the first and second electrode tabs covered by the protective member and facing the electrode collector of the respective one of the first and second electrode plates is exposed from the protective member and is coupled to the non-coating portion of the respective one of the first and second electrode plates, and a portion of the at least one of the first and second electrode tabs overlapping the non-coating portion of the respective one of the first and second electrode plates and facing the electrode collector of the other one of the first and second electrode dates is exposed from the protective member, and
wherein, at the end of the at least one of the first and second electrode tabs, the protective member surrounds an edge of a surface of the at least one of the first and second electrode tabs that is facing the electrode collector of the respective one of the first and second electrode plates.

2. The electrode assembly as claimed in claim 1, wherein the protective member has a welding hole exposing the portion of the at least one of the first and second electrode tabs facing the electrode collector of the other one of the first and second electrode plates for welding the at least one of the first and second electrode tabs.

3. The electrode assembly as claimed in claim 1, further comprising an adhesive on a surface of the protective member for adhering the protective member to the electrode collector of the respective one of the first and second electrode plates.

4. An electrode assembly of a secondary battery, the electrode assembly comprising:
a first electrode plate, a second electrode plate, and a separator between the first and second electrode plates, the first electrode plate including a first electrode collector and a first electrode tab coupled thereto, and the second electrode plate including a second electrode collector and a second electrode tab coupled thereto; and
a protective member surrounding an end of at least one of the first and second electrode tabs,
wherein a portion of the at least one of the first and second electrode tabs is exposed from the protective member and is coupled to a non-coating portion of a respective one of the first and second electrode plates, and
wherein the protective member comprises:
a first protective member on an upper portion of the at least one of the first and second electrode tabs; and
a second protective member coupled to a lower portion of the first protective member and surrounding the at least one of the first and second electrode tabs together with the first protective member.

5. The electrode assembly as claimed in claim 1, wherein the protective member has a curved surface at a corner coupled to the non-coating portion.

6. The electrode assembly as claimed in claim 1, wherein the electrode assembly has a jelly roll shape in which the first electrode plate, the separator, and the second electrode plate are stacked and wound, and the first electrode tab is spaced apart from the second electrode tab.

7. The electrode assembly as claimed in claim 1, further comprising at least one additional first electrode plate, at least one additional separator, and at least one additional second electrode plate, wherein
the electrode assembly has a stack structure in which the first electrode plates, the separators, and the second electrode plates are stacked, and
the first electrode tabs of the first electrode plates are connected together to form a first electrode terminal, and the second electrode tabs of the second electrode plates are connected together to form a second electrode terminal.

8. The electrode assembly as claimed in claim 7, wherein the first electrode terminal is formed by bending one of the first electrode tabs to surround at least one other of the first electrode tabs, and the second electrode terminal is formed by bending one of the second electrode tabs to surround at least one other of the second electrode tabs.

9. The electrode assembly as claimed in claim 8, wherein the bent tabs are the uppermost or lowermost one of the first electrode tabs and the uppermost or lowermost one of the second electrode tabs.

10. The electrode assembly as claimed in claim 8, wherein the bent tabs have lengths greater than respective lengths of the at least one other of the first electrode tabs and the at least one other of the second electrode tabs.

11. The electrode assembly as claimed in claim 8, wherein the bent tabs have thicknesses greater than respective thicknesses of the at least one other of the first electrode tabs and the at least one other of the second electrode tabs.

12. A method of fabricating an electrode assembly of a secondary battery, the electrode assembly including a first electrode plate, a second electrode plate, and a separator between the first and second electrode plates, the first electrode plate including a first electrode collector and a first electrode tab coupled thereto, and the second electrode plate including a second electrode collector and a second electrode tab coupled thereto, the method comprising:

preparing the first electrode tab, the second electrode tab, and a protective member covering an end of at least one of the first and second electrode tabs;

welding a portion of the at least one of the first and second electrode tabs that is exposed from the protective member to a non-coating portion of a respective one of the first and second electrode plates, the end of the at least one of the first and second electrode tabs overlapping the non-coating portion of the respective one of the first and second electrode plates, a portion of the at least one of the first and second electrode tabs that is covered by the protective member and facing the electrode collector of the respective one of the first and second electrode plates being exposed from the protective member and coupled to the non-coating portion of the respective one of the first and second electrode plates; and sequentially stacking the first electrode plate, the separator, and the second electrode plate, wherein, in preparing the first and second electrode tabs and the protective member, at the end of the at least one of the first and second electrode tabs, the protective member surrounds an edge of a surface of the at least one of the first and second electrode tabs that is facing the electrode collector of the respective one of the first and second electrode plates.

13. The method as claimed in claim 12, wherein, in preparing the first and second electrode tabs and the protective member, a welding hole is formed in a surface of the protective member.

14. The method as claimed in claim 13, wherein welding the at least one of the first and second electrode tabs is performed at an upper portion of the protective member through the welding hole.

15. The method as claimed in claim 12, wherein, in preparing the first and second electrode tabs and the protective member, the protective member has a curved surface at a corner of a portion surrounding the end of the at least one of the first and second electrode tabs.

16. The method as claimed in claim 12, in preparing the first and second electrode tabs and the protective member, the protective member comprises a first protective member on an upper portion of the at least one of the first and second electrode tabs, and a second protective member on a lower portion of the first protective member and surrounding the at least one of the first and second electrode tabs together with the first protective member.

17. The method as claimed in claim 12, further comprising, after stacking the first electrode plate, the separator, and the second electrode plate, winding the first electrode plate, the separator, and the second electrode plate to form the electrode assembly.

18. The method as claimed in claim 12, further comprising, after stacking the first electrode plate, the separator, and the second electrode plate:

preparing at least one additional first electrode plate, at least one additional second electrode plate, and at least one additional separator and stacking the first electrode plates, the separators, and the second electrode plates; and connecting the first electrode tabs of the first electrode plates together to form a first electrode terminal, and connecting the second electrode tabs of the second electrode plates together to form a second electrode terminal.

19. The method as claimed in claim 18, wherein forming the first and second electrode terminals comprises:

bending one of the first electrode tabs to surround the at least one other of the first electrode tabs; and bending one of the second electrode tabs to surround the at least one other of the second electrode tabs.

20. The method as claimed in claim 19, wherein forming the electrode terminals comprises bending the uppermost or lowermost one of the first electrode tabs and the uppermost or lowermost one of the second electrode tabs.

21. The method as claimed in claim 19, wherein forming the electrode terminals comprises bending the first electrode tab having a length greater than that of the at least one other of the first electrode tabs and the second electrode tab having a length greater than that of the at least one other of the second electrode tabs.

22. The method as claimed in claim 19, wherein forming the electrode terminals comprises bending the first electrode tab having a thickness greater than that of the at least one other of the first electrode tabs and the second electrode tab having a thickness greater than that of the at least one other of the second electrode tabs.

* * * * *